United States Patent [19]
Thompson

[11] Patent Number: 5,825,750
[45] Date of Patent: Oct. 20, 1998

[54] METHOD AND APPARATUS FOR MAINTAINING SECURITY IN A PACKETIZED DATA COMMUNICATIONS NETWORK

[75] Inventor: Horace C. Thompson, Scottsdale, Ariz.

[73] Assignee: Motorola, Schaumburg, Ill.

[21] Appl. No.: 625,508

[22] Filed: Mar. 29, 1996

[51] Int. Cl.$^6$ ..................................... H04J 1/16
[52] U.S. Cl. ................... 370/244; 370/310; 370/410; 379/59; 379/111; 455/410
[58] Field of Search ..................... 370/244, 270, 370/410, 428, 310; 379/59, 60, 111, 145; 455/33.1, 405, 410

[56] References Cited

U.S. PATENT DOCUMENTS

| | | | |
|---|---|---|---|
| 5,012,466 | 4/1991 | Buhrke et al. | 370/270 |
| 5,335,265 | 8/1994 | Cooper et al. | 379/60 |
| 5,335,278 | 8/1994 | Matchett et al. | 379/59 |
| 5,345,595 | 9/1994 | Johnson et al. | 455/33.1 |
| 5,473,679 | 12/1995 | La Porta et al. | 370/410 |
| 5,627,886 | 5/1997 | Bowman | 379/111 |

*Primary Examiner*—Douglas W. Olms
*Assistant Examiner*—Shick Hom
*Attorney, Agent, or Firm*—Bradley J. Botsch, Sr.; James A. Coffing

[57] ABSTRACT

Invalid transmissions in an ATM network (200) are identified by maintaining a user profile (304) relating to network use for each participating node of the network (200) and detecting potentially invalid transmissions based on a deviation (312) from the user profile. In a preferred embodiment, the user profile is continuously updated by monitoring transmissions within the ATM network (200), taking advantage of information included in defined fields of the transmitted ATM cells. When a detected deviation exceeds a predetermined threshold (314), the source node of the transmission is investigated to verify the identity of the source node user. The investigation is accomplished prior to establishing a security link between the source node and a secured node (202), thereby increasing availability of the secured node (202) for use by authorized network users.

28 Claims, 4 Drawing Sheets

//]: #

METHOD AND APPARATUS FOR MAINTAINING SECURITY IN A PACKETIZED DATA COMMUNICATIONS NETWORK

FIELD OF THE INVENTION

The present invention relates generally to maintaining security in a data communications network and, more particularly, to a method for maintaining security in a packetized data network, such as an asynchronous transfer mode (ATM) network, by identifying invalid transmissions based on deviations from a user profile.

BACKGROUND OF THE INVENTION

In data communications networks, security devices are employed to limit access to the network, to nodes within the network and to specific restricted access data. In this regard, security devices are employed at subscriber network interfaces to limit network use to only authorized subscribers. Within a network, a security device can be used to limit access to certain nodes, or to confidential data stored within certain computers, based on specified security clearance levels. Network security is therefore implemented relative to a variety of objectives.

A principal network security technique involves identifying a source node or user based on a user identification code. The associated security exchange typically occurs after the start-up procedure, or so-called handshake, between the source node and secured node of the subject communication. At that time, the secured node commonly prompts the source node to enter an identification code, which entered code is then compared to stored security information. Based on the comparison, access to the network is granted or denied, or a security clearance level for controlling network use is determined.

Such security systems are not fully satisfactory for many applications. In particular, such systems may be defeated by unscrupulous persons. Because the source node is notified that a security check is occurring when the identification code prompt is received, such persons are afforded an opportunity to circumvent the security measures. In some cases, computers have been programmed to systematically seek access to secured networks through repeated access attempts. Even when unsuccessful, network resources are occupied for some length of time by such attempts, reducing availability for authorized users.

There is therefore a need for a network security system for more accurately identifying invalid transmissions or attempted incursions against a secured network. There is also a need for a network security system that reduces the drain on network resources incurred by invalid transmissions and associated security measures.

DETAILED DESCRIPTION OF A PREFERRED EMBODIMENT

Figure 1:
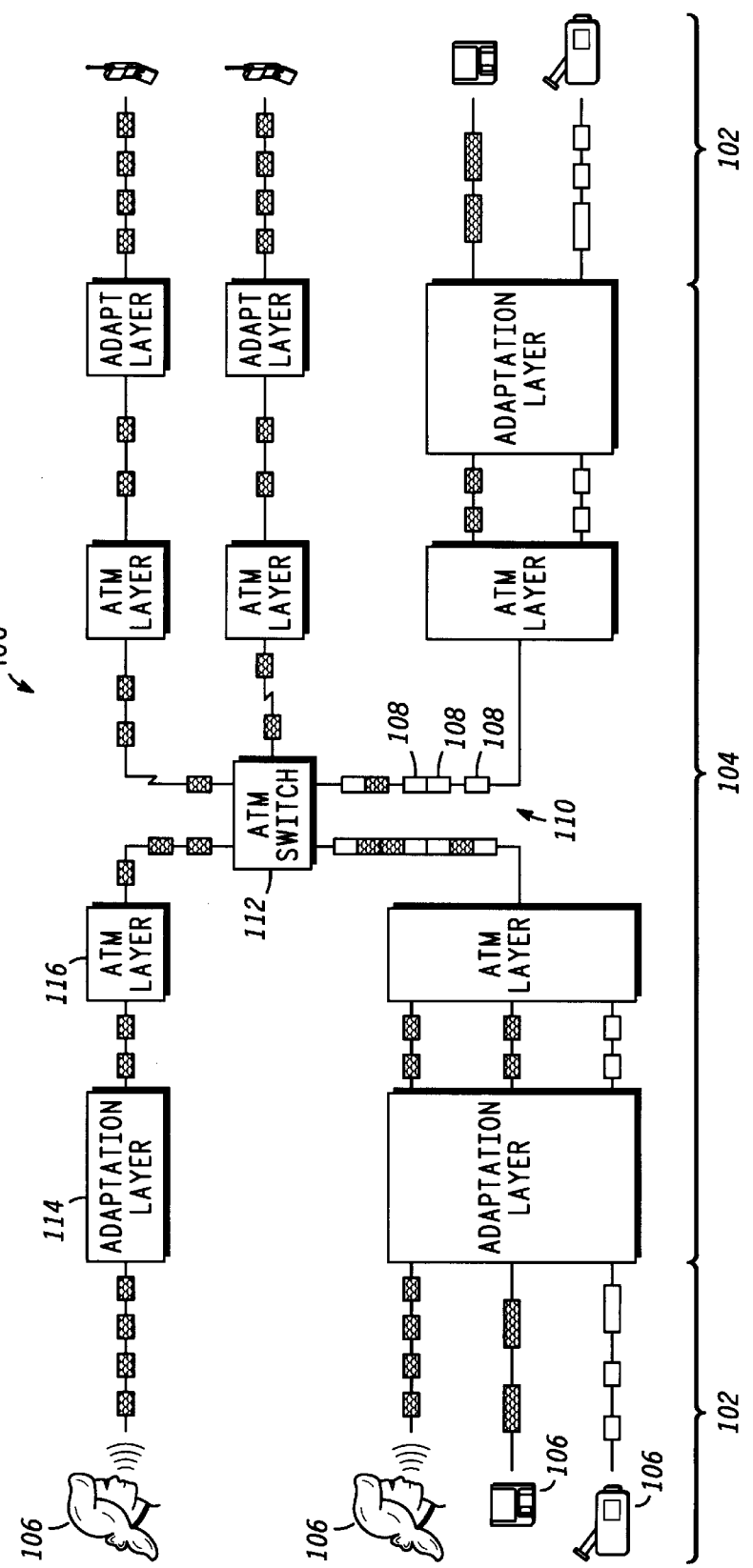
FIG. 1 is a diagram of an ATM network in which the present invention can be implemented.

The present invention provides a method for identifying invalid transmissions in a data communications network based on a deviation from a user profile relating to network use. In addition, the invention allows for investigation of network transmissions for enhanced identification of invalid transmissions. In a preferred embodiment, these network security measures are completed prior to establishing a communication link between the source and secured nodes, thereby increasing availability of the secured node for use by authorized users.

Generally, a preferred method of the present invention involves maintaining a user profile for each participating node in a communications network, monitoring transmissions in the network to identify a transmission that deviates from the user profile, analyzing the deviation and controlling network use in response to the analysis. The user profile, which can be permanently stored or periodically or continuously updated, can include historical network use information for the source node and/or information regarding transmission characteristics allowed under a network contract associated with the source node. An identified deviation can be analyzed by comparison to a static or programmable deviation threshold, or by actively investigating the source node. In response to the analysis, network use can be controlled by denying or limiting access to the secured node.

The present invention can be advantageously implemented in the context of a packetized data communications network such as an ATM network. That is, certain characteristics of such networks can be employed for security purposes according to the present invention. In a packetized data communications network, information is delivered between locations in the network in relatively small units, known as packets. The packets may be of variable length or of fixed length, depending on the communications protocol being implemented. Each packet typically includes network information relating to packet processing and user information. For example, in an ATM network, each packet comprises a fixed length cell having a header portion and a payload portion. The network information is primarily included in the header portion. In an Ethernet system, the packets comprise variable length frames having an address field, a variable length data field, and an error checking field.

In the description below, an embodiment of the invention is set forth in the context of an ATM network. The features of an ATM network relevant to the present invention can be understood by reference to FIG. 1, where the ATM network is generally identified by the reference numeral 100. The network 100 includes a synchronous portion 102 and an asynchronous portion 104. In the synchronous portion 102, user information signals are transmitted from nodes 106 in the form of a continuous data stream or in multiplexed frames synchronized with a system clock. In the asynchronous portion, the user information is transferred between nodes 106 in the form of fixed length packets of information or ATM cells 108 that can be switched extremely rapidly.

The ATM cells 108 are multiplexed using asynchronous time-division multiplexing (ATDM). More particularly, each ATM cell 108 is stored in a buffer and then retrieved and placed within an ATDM signal 110 according to a prescribed scheduling principle. The cell location in the ATDM signal 110 may thus be asynchronous with respect to the input user information signals. This multiplexing technique allows for greater signal channel utilization and also provides significant versatility in handling a variety of broadband signal applications, such as voice, video and data as generally indicated in FIG. 1.

Each ATM cell 108 includes a header portion and a payload portion. As will be understood from the description below, certain information included in these cell portions for ATM network purposes can be used according to the present invention for security purposes. The header portion includes a number of fields for handling switching information, cell information, and administration matters. The switching information includes a virtual path identifier (VPI) and a virtual channel identifier (VCI) which collectively define a transmission route for use by an ATM switch 112 in routing ATM cells from node to node. The cell information includes payload type, e.g., used to identify operation and maintenance (OAM) cells, and cell loss priority, used to identify cells that may be discarded if necessary and to identify a user who is exceeding the cell arrival rate of his network contract. The ATM layer 116, as illustrated in FIG. 1, is involved in cell header generation and extraction, as well as cell multiplexing and demultiplexing and other functions.

The payload portion comprises a segment of user information, conventionally 48 octets in length. This user information can include both the communication information and ATM adaptation layer (AAL) information. The AAL 114 is involved in segmentation and reassembly (SAR) of the user information, e.g., mapping the user information into the ATM cells 108 and vice versa. As generally shown in FIG. 1, the AAL functions are provided by node terminal equipment or by terminal adapters. The AAL protocols employed are determined by agreement between the terminals and may vary, for example, depending on the communications application, e.g., voice or video. This header and AAL information enables the ATM network to perform the functions and achieve the benefits identified above. It also can be used according to the present invention to identify and thwart unauthorized incursions against the network, as will be understood from the description below.

Figure 2:
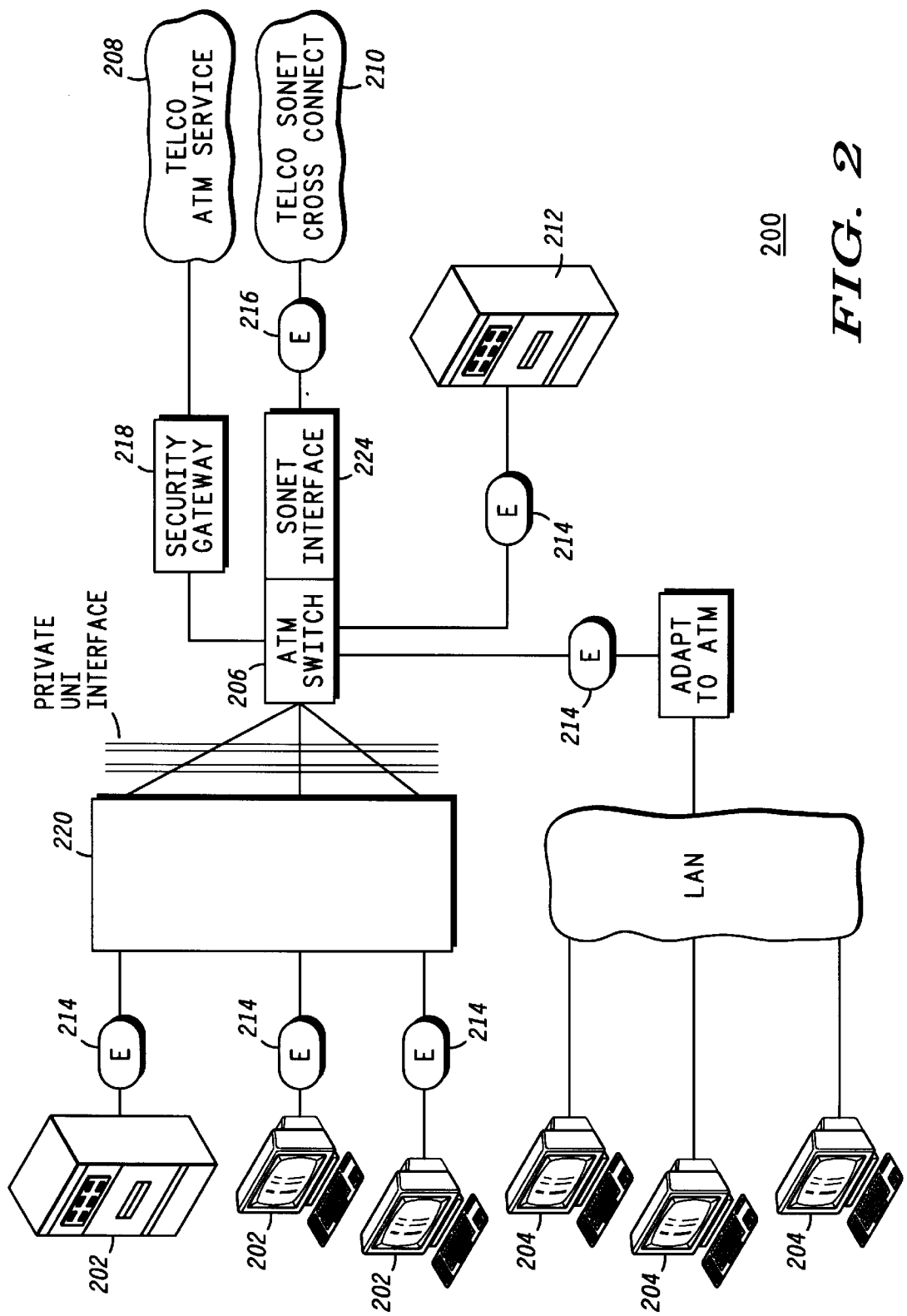
FIG. 2 is a diagram illustrating a secured ATM network, in accordance with the present invention.

FIG. 2 shows a secured ATM network 200, in accordance with the present invention. Although the security system can be implemented in a variety of communications network environments, the illustrated network 200 includes a number of secured user nodes 202 connected to a number of local area network (LAN) user nodes 204 and an independent user node 212 via an ATM switch 206. The ATM switch 206 may further service the synchronous optical network (SONET) services 210 of a telephone company, via SONET interface 224, as well as the telephone company ATM services 208. The illustrated ATM network 200 also involves user node or LAN encryptors 214, a SONET link encryptor 216 and a TELCO ATM service security gateway 218, as is known.

The security system of the present invention is preferably implemented by a cell processor 220 interposed between the ATM switch 206 and the secured nodes 202 at the user network interface (UNI) 222. The illustrated cell processor 220 performs the ATM layer and AAL layer functions as described above in addition to implementing the security procedures discussed in detail below. In this regard, it will be appreciated that the cell processor 220 receives ATM cells from the ATM switch 206, and is capable of extracting cell header information as well as AAL protocol information from the user information field of received cells.

Physically, the illustrated cell processor 220 is implemented using Gallium Arsenide (GaAs) semiconductor technology, preferably of the complementary type, to enable real-time or substantially real-time security monitoring. Implementing the cell processor 220 in complimentary GaAs semiconductor technology allows for significant speed enhancement and power reduction relative to complementary metal oxide semiconductor (CMOS) implementation, and accommodates use of the present invention within ATM networks operating at OC 192 (i.,e., at or near 10 Gbps) rates.

Figure 3:
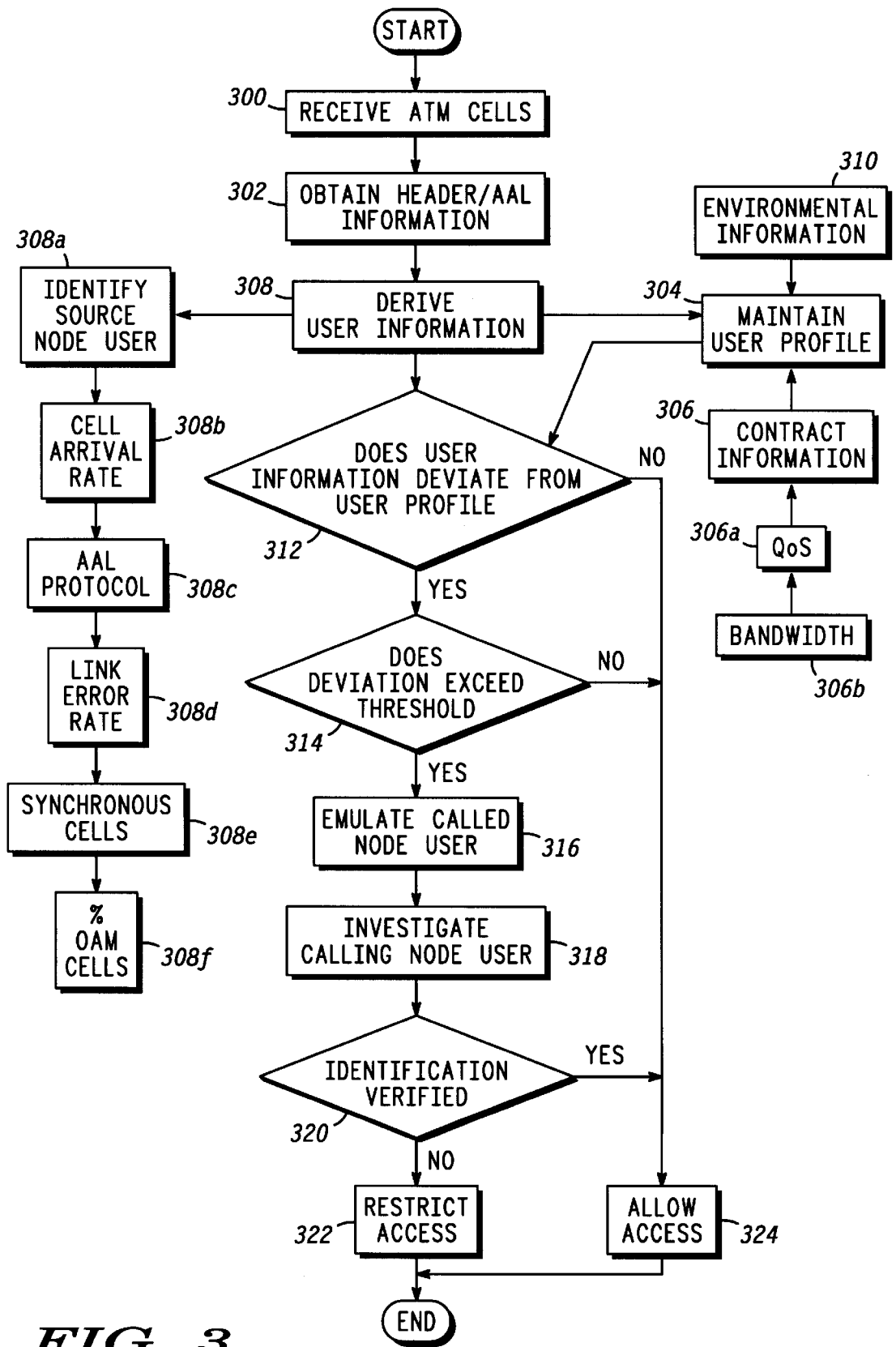
FIG. 3 is a flowchart depicting operation of a security system, in accordance with the present invention.

FIG. 3 is a flowchart depicting the inventive security system implemented by the cell processor 220 (FIG. 2). Referring to FIGS. 2 and 3, the security system detects a potentially invalid transmission by identifying deviations from a user profile for a given source node. The cell processor 220 includes an interface for use with an asynchronous portion of the ATM network 200 to receive (300) ATM cells. As previously noted, the cell processor 220 performs the AAL and ATM layer functions for the secured nodes 202. In connection with these functions, the cell processor 220 obtains (302) the cell header information and obtains AAL information from the user information field of each cell.

Based on the header and AAL information, the cell processor 220 can derive (308) user information regarding the source node user. Due to the multiplexed nature of ATM networks, each cell includes identifying information, e.g., the VCI and VPI, that identifies the source of the communication.

Accordingly, the derived user information is used to identify (308a) the source node user. All other derived user information can therefore be indexed to a specific source node user.

A variety of user information in addition to the identification information can be derived from the header and AAL information. For example, by monitoring the receipt of cells from a particular source node user over a period of time, the cell processor 220 can determine (308b) cell arrival rate. This provides an indication of the bandwidth or quality of service (QoS) requested by the source node user. In addition, the AAL protocol can be derived (308c) from the ATM cell user information field. A number of AAL protocols have been or are being standardized. Users can also employ their own proprietary or private protocols. An additional item of user information that can be derived (308d) from the ATM cells by the cell processor 220 is link error rate. A certain number of cells will experience link errors, which can be detected by the cell processor 220. By monitoring such errors over a period of time, the cell processor 220 can derive (308d) a link error rate for a particular node user.

Conventional networks require synchronization of the source and target nodes. To meet this requirement, the cell stream may be marked relative to a network clock. Such marking may involve the use of a synchronous residual time stamp (SRTS) provided according to certain AAL protocols. Such synchronization characteristics can be monitored (308e) to provide a further profile parameter. The cell processor 220 can also be used to monitor (308f) the percentage of OAM cells for a particular source node. OAM cells are employed, for example, to monitor the operation of the virtual path and virtual channel connections, to provide performance and impairment information regarding the connections, and to provide alarms when necessary.

Any or all of this user information can be stored by the cell processor 220, and periodically or continuously (on a cell-by-cell basis) updated to maintain (304) a user profile for each participating node. In addition to this derived user information, the user profile can be maintained by reference to environmental information (310) and contract information (306). The environmental information can include, for example, time of day. By indexing call requests from a particular node to time of day, the cell processor 220 can develop a time-usage profile for a particular source node user relating to normal usage hours, frequency, or duration. This environmental information, in combination with the derived user information discussed above, constitutes historical information regarding network use.

The contract information relates to the user's network contract. When a node user accesses the ATM network 200, a contract is formed relating to usage parameters such as QoS (306a) and bandwidth (306b). Adherence to the contracted usage parameters is policed by the ATM network 200 and is reflected inreflected in cell loss priority (CLP) values. That is, the cell header includes a one bit field that is used to indicate the priority of cell loss should a circumstance occur that requires the discarding of cells. If the CLP field contains a "1", the cell is deemed of lower priority and will be discarded before a cell having a CLP of "0". A failure to adhere to contracted usage parameters may result in cells being tagged with a CLP of "1".

Based on the foregoing inputs or portions thereof, a user profile is maintained. This user profile is then compared (312) to derived user information for a transmission under consideration to identify any deviation from the profile maintained for the source node user. For example, a deviation can be identified when the source node user is operating outside of its normal operation hours, is exhibiting an unusual cell arrival rate, or is employing a bandwidth that is not in conformance with its user network contract. Identifying such a deviation triggers the cell processor 220 to implement an analysis as set forth below. If no deviation is identified, the source node is allowed (324) to access the secured node.

In a preferred embodiment, the security system implemented by the cell processor 220 determines (314) a deviation threshold so as to distinguish ordinary or minor deviations from more significant deviations that might indicate an attempted unauthorized incursion against the secured network nodes 202. In addition, it is desirable that the threshold be somewhat flexible to meet varying security needs and accommodate usage patterns that change gradually over time. Accordingly, the cell processor 220 preferably employs a programmable threshold and, more preferably, a dynamic programmable threshold that adapts to changes over time.

In the security system of the illustrated embodiment, an adaptive or heuristic approach is employed to set the dynamic deviation threshold. In particular, the cell processor 220 continuously monitors network transmissions and updates a user profile database based on such interaction. As a result, gradual changes in network usage or node characteristics are accommodated within the framework of the deviation threshold determination. If the deviation is within the threshold limits, the source node user is allowed (324) to access the secured node.

If the deviation exceeds the deviation threshold, the cell processor can conduct an investigation of the source node user. In order to conduct such an investigation, a communication link to the source node is established. However, it is desirable that the investigation be conducted without establishing communication between the source node user and the secured node 202, thereby enhancing security and freeing the secured node 202 for greater accessibility to authorized users. In this regard, the cell processor 220 is capable of emulating (316) the ATM signaling protocols for the secured node so that a communication link between the source node and the cell processor 220 can be switched through to permit investigation of the source node user.

Once a communication link is established, the cell processor 220 can interactively investigate (318) the source node user. Such investigation involves, for example, querying the source node user for information that only the authorized user would know. Based on responses from the source node user, the source node user is determined to be authorized or potentially unauthorized. If the identification is verified (320) as an authorized user, access to the secured node is allowed (324). If the user cannot be verified as an authorized user, access to the secured node can be restricted (322), i.e., denied or limited.

In the alternative or in addition, the cell processor 220 can be programmed to conduct periodic, or even aperiodic (e.g., random), investigations of cell requests without regard to deviations from a user profile. In this manner, attempted incursions by unauthorized users can be identified even though the user profile is closely replicated. Moreover, based on monitored network use by each participating node, potentially invalid use of the network can be detected independent of deviation from a user profile. For example, the cell processor 200 can be programmed to investigate successive access requests by the same node or other suspicious activity pattern without regard to any user profile.

Figure 4:
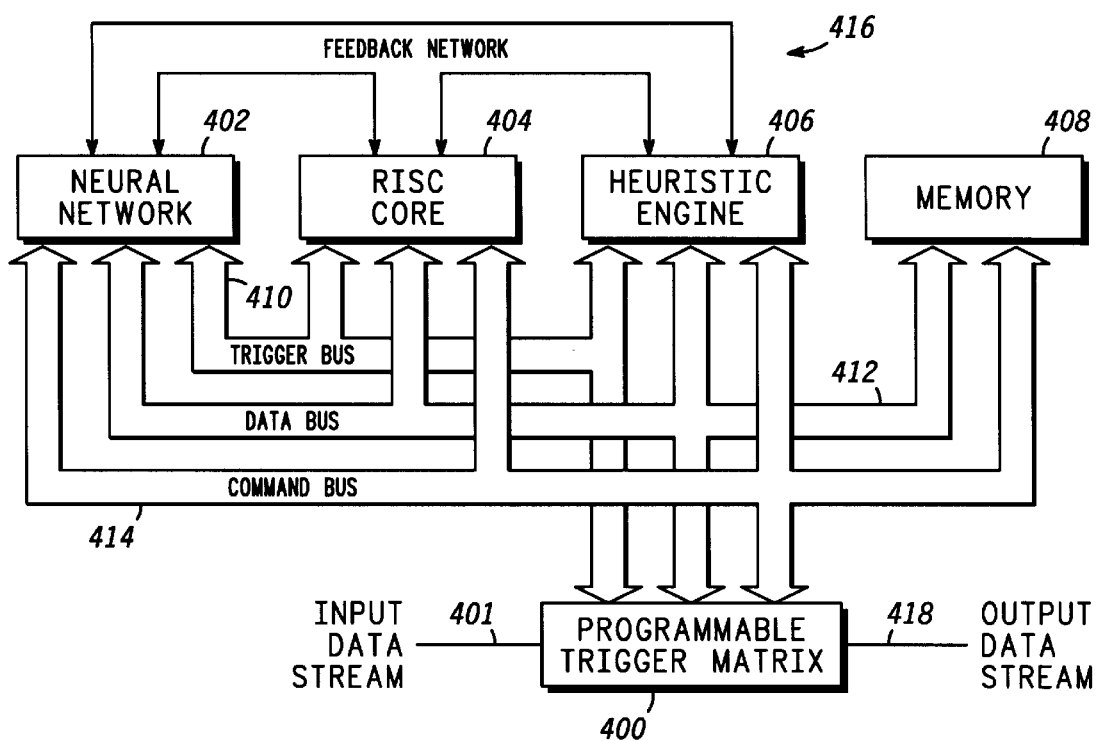
FIG. 4 is a diagram generally illustrating operation of a security system in accordance with the present invention.

FIG. 4 illustrates operation of the programmable threshold function embodied in the sentinel apparatus represented by cell processor 220, shown in FIG. 2. The threshold function is implemented by a programmable trigger matrix 400, a neural network 402, a reduced instruction set computer (RISC) core 404, a heuristic engine 406 and a memory 408. The programmable trigger matrix 400 receives an input data stream 401 as a result of an ATM transmission and determines whether investigation of the source node is required based on information from components 402–408. The neural network monitors communications, selects the key user information variables that will drive the heuristic engine 406 and determines the process for investigating the user node when necessary. In this regard, the neural network 402 provides the highest level logic and is used to program the programmable trigger matrix 400, the RISC core 404 and the heuristic engine 406 via the trigger bus 410, data bus 412 and command bus 414.

In a preferred embodiment, the RISC core 404 compiles a statistical histogram for all participating nodes based on monitored network use. The heuristic engine 406 employs fuzzy logic to set a dynamic threshold as discussed above. In this manner, the threshold function is provided with an adaptive characteristic such that gradual changes in network usage or node characteristics can be accommodated. The memory 408 stores user profiles and keeps a running record based on monitored transmissions, i.e., is updated on a cell-by-cell basis. The neural network 402, RISC core 404 and heuristic engine 406 communicate via a feedback network 416 to implement a real-time programmable, adaptive threshold deviation analysis. Based on this analysis, the programmable trigger matrix 400 responds to the input data stream 401 by selectively restricting or allowing communication with a secured node, via the output data stream 418.

The present invention thus provides a method for identifying invalid transmissions based on a deviation from a user profile relating to network use. Suspicious or selected transmissions can be investigated for enhanced accuracy in identifying attempted unauthorized incursions. These security measures can be advantageously implemented prior to establishing a communication link between the source node and secured node, thereby increasing availability of the secured node for use by authorized users.

What is claimed is:

1. A method for use in securing a packetized data communications network against invalid transmissions, said packetized data communications network including a plurality of user nodes, and an asynchronous portion wherein signals are communicated in data packets, said method comprising the steps of:

maintaining a user profile for at least a selected one of said plurality of user nodes, said user profile including profile information regarding network use for said selected one of said plurality of user nodes;

monitoring the transmission of said data packets in said asynchronous portion of said packetized data communications network to identify a deviation from said user profile;

analyzing said deviation from said user profile including the step of emulating signaling protocols of said packetized data communications network so as to allow for investigation of said selected one of said plurality of user nodes free from establishment of a communication link between said packetized data communications network and said selected one of said plurality of user nodes; and controlling use of said packetized data communications network in response to said step of analyzing.

2. The method of claim 1, wherein said profile information comprises contract information regarding transmission characteristics allowed under a network contract associated with said selected one of said plurality of user nodes.

3. The method of claim 2, wherein said contract information comprises one of quality of service and bandwidth information for said selected one of said plurality of user nodes.

4. The method of claim 1, wherein said profile information comprises historical information regarding network use patterns for said selected one of said plurality of user nodes.

5. The method of claim 4, wherein said packetized data communications network comprises an asynchronous transfer mode (ATM) network, and wherein said historical information comprises one of time of day, cell arrival rate, ATM adaptation layer (AAL) protocol, link error rate, percentage of synchronous cells, and percentage of OAM cells information for said selected one of said plurality of user nodes.

6. The method of claim 1, wherein said step of maintaining a user profile comprises storing said profile information.

7. The method of claim 1, wherein said step of maintaining a user profile comprises updating said user profile based on successive monitored data packet transmissions within said packetized data communications network.

8. The method of claim 1, wherein said data packets comprise header portions including header information and payload portions including payload information and said step of monitoring the transmission comprises receiving said data packets and extracting said header information from said header portions of said data packets.

9. The method of claim 8, wherein said step of monitoring further comprises comparing information derived from said header information to said user profile.

10. The method of claim 1, wherein said step of analyzing comprises comparing said deviation to a deviation threshold.

11. The method of claim 1, wherein said deviation is identified with respect to an attempted communication from a source node user to a secured node user, and said step of analyzing comprises investigating said source node user to verify that said source node user is authorized to access said secured node user.

12. The method of claim 11, wherein said step of investigating comprises requesting identification information from said source node user.

13. A method for use in securing a packetized data communications network against invalid transmissions, said packetized data communications network including a plurality of user nodes, and an asynchronous portion wherein signals are communicated in data packets, said method comprising the steps of:

maintaining a user profile for at least a selected one of said plurality of user nodes, said user profile including profile information regarding network use for said selected one of said plurality of user nodes;

monitoring the transmission of said data packets in said asynchronous portion of said packetized data communications network to identify a deviation from said user profile;

analyzing said deviation from said user profile; and controlling use of said packetized data communications network in response to said step of analyzing wherein said deviation is identified with respect to an attempted communication from a source node user to a secured node user, and said step of analyzing comprises investigating said source node user to verify that said source node user is authorized to access said secured node user and wherein said step of analyzing comprises emulating signaling protocols for said secured node user so as to allow for investigation of said source node user free from establishment of a communication link between said source node user and said secured node user.

14. The method of claim 1, wherein said deviation is identified with respect to an attempted communication from a source node user to a secured node user, and said step of controlling comprises preventing establishment of a communication link between said source node user and said secured node user.

15. The method of claim 1, wherein said deviation is identified with respect to an attempted communication from a source node user to a secured node user, and said step of controlling comprises limiting access to said secured node user by said source node user.

16. The method of claim 1, further comprising the step of investigating a source of a transmission within said packetized data communications network independent of any deviation from said user profile.

17. A method for use in securing a packetized data communications network against invalid transmissions, said packetized data communications network including a plurality of user nodes, and an asynchronous portion wherein signals are communicated in data packets, said method comprising the steps of:

interposing a security device between a switch and a secured node of said packetized data communications network;

using said security device to receive a transmission of at least one data packet from a source node across said asynchronous portion of said packetized data communications network to a secured node of said network;

establishing a communication link between said source node and said security device by emulating signaling protocols of said secured node; and using said communication link between said source node and said security device to verify an identity of a user at said source node.

18. The method of claim 17, wherein said step of establishing comprises analyzing said transmission to obtain information regarding said source node.

19. The method of claim 17, further comprising the step of maintaining a user profile for each participating node in said network, said user profile including information regarding network use, wherein said communication link is established responsive to a detected deviation from said user profile for said source node.

20. The method of claim 17, wherein said step of using said communication link comprises requesting identification information from said user at said source node.

21. The method of claim 17, further comprising the step of investigating a source of a transmission within said packetized data communications network independent of any deviation from a user profile.

22. A method for use in securing a packetized data communications network against invalid transmissions, said packetized data communications network including a plurality of user nodes, and an asynchronous portion wherein signals are communicated in data packets, said method comprising the steps of:

maintaining a user profile for each participating node of said packetized data communications network, said user profile including profile information regarding network use for each said participating node;

monitoring transmissions in said network to identify a deviating transmission from a participating source node that deviates from said user profile;

comparing said deviating transmission to a deviation threshold;

establishing communications to said participating source node before a communications link between said packetized data communications network and said participating source node is made;

selectively investigating said participating source node responsive to said step of establishing; and controlling network use by said participating source node responsive to said step of investigating.

23. The method of claim 22, wherein said step of maintaining comprises continuously monitoring transmissions in said network to update said user profile.

24. The method of claim 22, wherein said step of monitoring transmissions comprises deriving information from one of a header portion and a user information portion of transmitted data packets.

25. A method for use in securing a packetized data communications network against invalid transmissions, said packetized data communications network including a plurality of user nodes and an asynchronous portion wherein signals are communicated in data packets, said method comprising the steps of:

monitoring the transmission of data packets in said asynchronous portion of said data communications network;

based on said step of monitoring, identifying successive transmissions from one of said plurality of user nodes;

analyzing said successive transmissions to detect activity indicative of potentially invalid use of said packetized data communications network;

emulating signal protocols of said packetized data communications network;

sending said emulated signal protocols to said one of said plurality of nodes to verify an identity of a user at said one of said plurality of nodes; and controlling use of said packetized data communications network in response to said step of verifying.

26. The method of claim 25, wherein said step of analyzing comprises identifying a suspicious activity pattern independent of knowledge of a user profile for said one of said plurality of user nodes.

27. A sentinel apparatus for use in detecting deviations from an expected transmission based on an input data stream from a source node in an asynchronous transfer mode (ATM) communications network, comprising:

a programmable trigger matrix, operably coupled to receive the input data stream;

a neural network, operably coupled to the programmable trigger matrix via a command bus;

a heuristic engine, operably coupled to the programmable trigger matrix via the command bus, and operably coupled to the neural network via a feedback network, wherein the heuristic engine provides a deviation threshold; and a memory module, operably coupled to the programmable trigger matrix via the command bus, and operably coupled to the neural network via a data bus, wherein the memory module stores user profiles and maintains transmission records from the source node wherein said neural network establishes a communications link to said source node by emulating signal protocols of said ATM communications network and wherein said communications link is used to verify an identity of a user of said source node.

28. The sentinel apparatus of claim 27, further comprising:

computing means for compiling a statistical histogram of at least the source node in the ATM network based on monitored network use.

* * * * *